United States Patent [19]

Collins et al.

[11] Patent Number: 4,945,559
[45] Date of Patent: Jul. 31, 1990

[54] TELEPHONE NETWORK INTERFACE APPARATUS

[75] Inventors: Thomas J. Collins, Wall; Pina Schneider, Ocean Township, Ocean County; Anthony L. Nieves, Bradley Beach; Thomas G. Graham, Ocean, all of N.J.

[73] Assignee: Keptel, Inc., Tinton Falls, N.J.

[21] Appl. No.: 433,572

[22] Filed: Nov. 7, 1989

Related U.S. Application Data

[63] Continuation of Ser. No. 139,590, Dec. 30, 1987, abandoned.

[51] Int. Cl.$^5$ .............................................. H04M 9/00
[52] U.S. Cl. ................................... 379/399; 379/413; 379/442; 439/133
[58] Field of Search ............... 379/399, 412, 413, 442; 439/133, 134, 352, 676, 344, 299, 300, 309

[56] References Cited

U.S. PATENT DOCUMENTS

| | | | |
|---|---|---|---|
| 4,488,008 | 12/1984 | Dellinger et al. | 379/30 |
| 4,588,238 | 5/1986 | Mickelson et al. | 439/345 |
| 4,647,725 | 3/1987 | Dellinger et al. | 379/379 X |
| 4,729,059 | 3/1988 | Wang | 361/56 X |
| 4,749,359 | 6/1988 | White | 379/399 X |

OTHER PUBLICATIONS

Sylvania, Network Interface Devices CP-850 Two Pair NID, 1985.
T11 Industries Inc., Tomorrow's Protection System is Here Today, undated.
Keptel, ML-5 An Interface System, for Today ... and Tomorrow, Trade Brochure, 4-1986.
Keptel, SNI-5000 Tomorrow's Network Interface System ... Today, Trade Brochure.

*Primary Examiner*—James L. Dwyer
*Attorney, Agent, or Firm*—R. Gale Rhodes, Jr.

[57] ABSTRACT

Telephone network interface apparatus for interconnecting incoming telephone company wiring to subscriber premises wiring including a base including a bottom and an outwardly extending wall circumscribing the bottom, the wall includes opposed first and second wall portions and the bottom and wall provide a compartment divided generally into opposed first and second compartment portions, the first compartment portion is adjacent the first wall portion and the second compartment portion is adjacent the second wall portion, the first compartment portion is for having first terminals mounted therein for connection to the telephone company wiring and the second compartment is for having second terminals mounted therein for connection to the subscriber premises wiring; a telephone company cover mounted pivotally to the second wall portion and for overlying the entire compartment, the telephone company cover includes opposed first and second portions, the first portion is solid and is for overlying and closing the first compartment portion and the second cover portion is provided with an opening for overlying and exposing the second compartment portion to the exterior upon the telephone company cover being closed, the telephone company cover is for being fastened only to the base, and the apparatus also includes a first fastener for fastening the telephone company cover only to the base; and a solid subscriber cover mounted pivotally to the second wall portion and for overlying only the second portion of the telephone company cover and for overlying and closing only the second compartment portion, the subscriber cover is for being fastened only to the telephone company cover and the apparatus also includes a second fastener for fastening the subscriber cover only to the telephone company cover. Two embodiments of replaceable individual subscriber line modules are included; one module is provided with a lockable subscriber security cover for denying other subscribers access to the individual subscriber's line terminals.

23 Claims, 6 Drawing Sheets

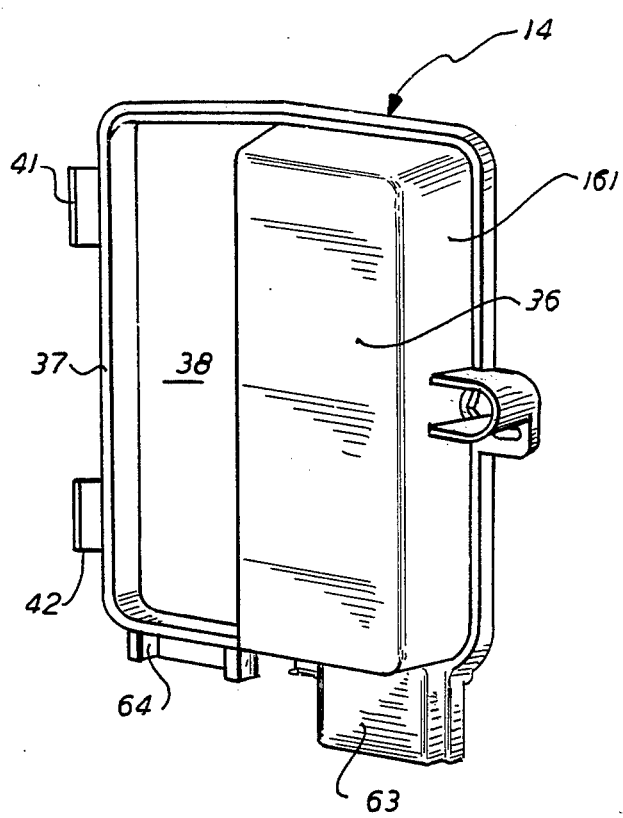
FIG. 4
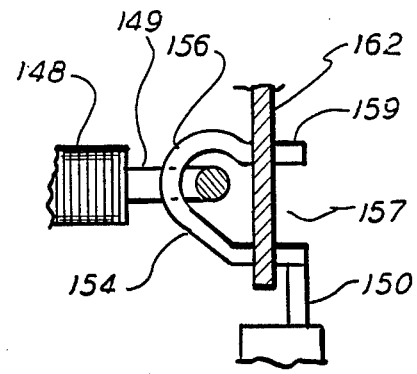
FIG. 18
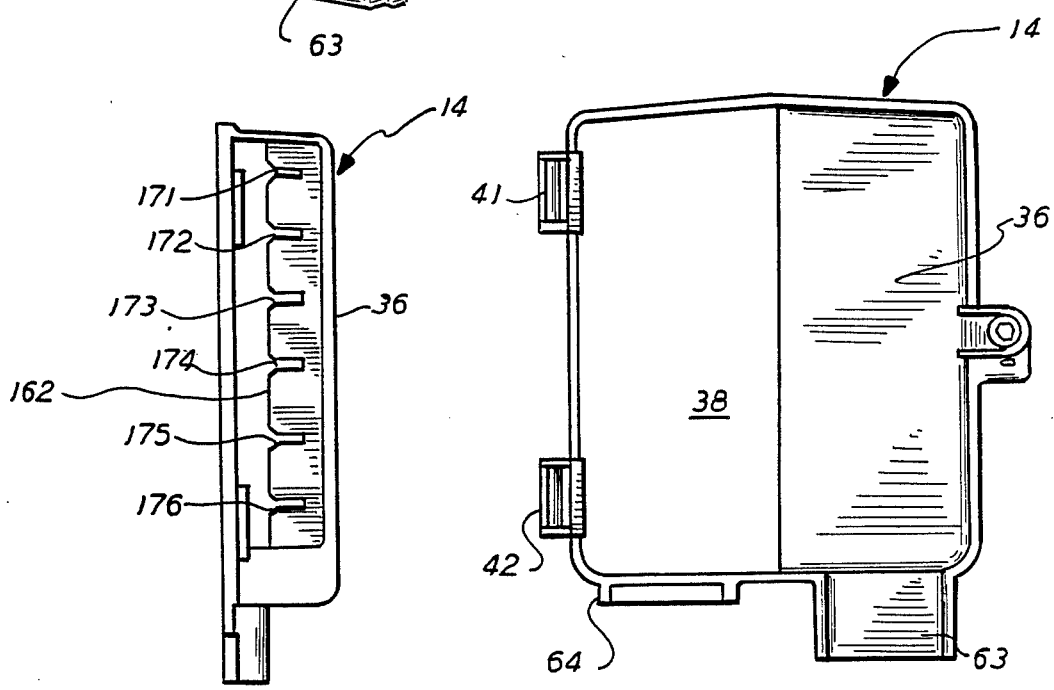
FIG. 5
FIG. 6

FIG. 7
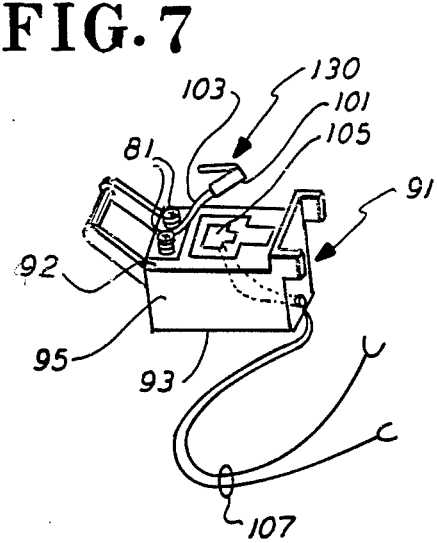
FIG. 8
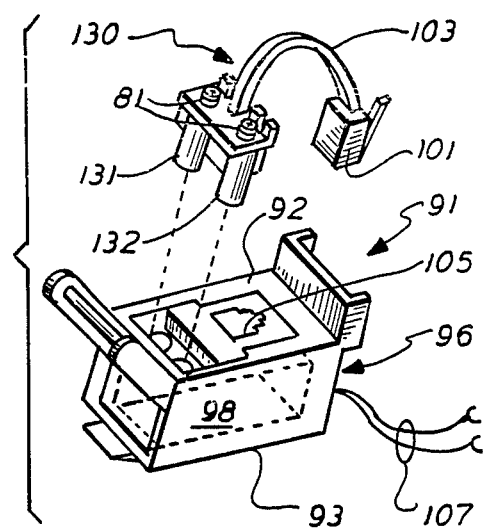
FIG. 9
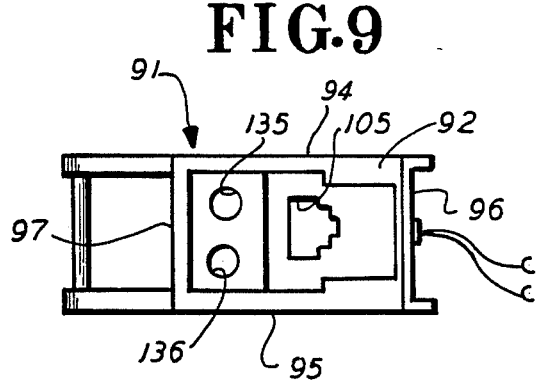
FIG. 10
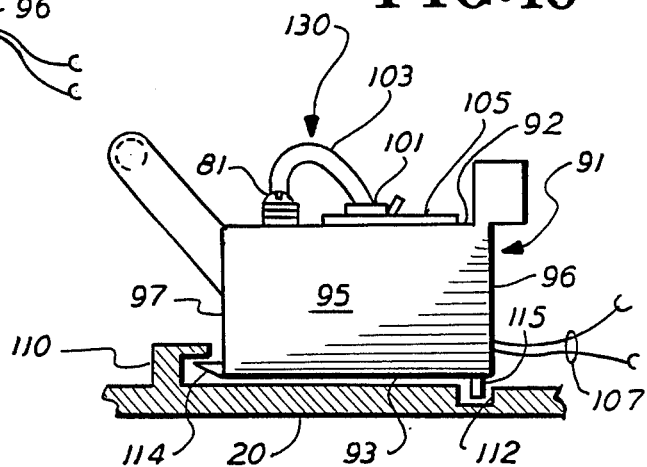
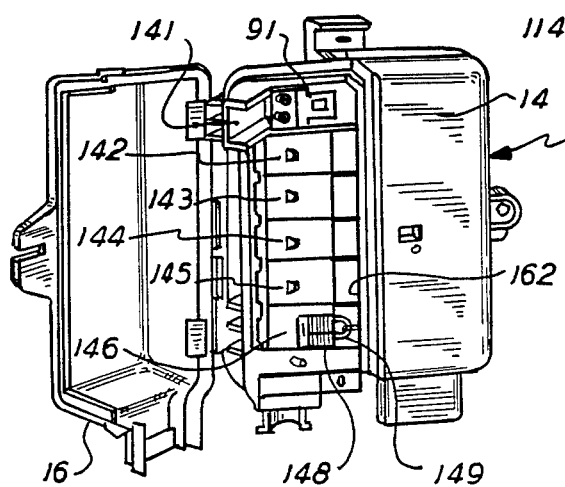
FIG. 11

TELEPHONE NETWORK INTERFACE APPARATUS

This is a continuation of application Ser. No. 139,590, filed Dec. 30, 1987, now abandoned.

BACKGROUND OF THE INVENTION

This invention relates generally to new and improved telephone network interface apparatus, and more particularly relates to new and improved telephone network interface apparatus for interconnecting incoming telephone company wiring to subscriber premises wiring and for providing a demarcation point therebetween to determine whether a fault exists on the incoming telephone company wiring or the subscriber premises wiring and which apparatus selectively allows for both individual subscriber and telephone company personnel access to the interior of the apparatus. This invention also relates to a new and improved individual subscriber line module which may be provided with a lockable subscriber security cover for denying other subscribers access to the individual subscriber's terminals.

Since the deregulation of the telephone industry and divestiture of portions of the Bell System, a competitive telephone equipment industry has arisen which, as it further develops, requires for saleability of telephone equipment a decrease in cost and an increase in cost avoidance in new telephone equipment providing increased functionality.

Accordingly, and as is further known to those skilled in the art, numerous prior art telephone network interface apparatus are known which are of the dual or double cover construction including both a telephone company cover and a subscriber cover mounted pivotally to a base. In such construction, as is further known, typically both the telephone company cover and the subscriber cover overlie and cover the entire base which construction requires that both covers be made of sufficient material for such coverage. Thus, there exists a need in the art, for reduced cost, to provide telephone network interface apparatus including both a telephone company door cover and a subscriber cover where at least one of the covers may be made of less material thereby reducing cost while still providing the selective access to the interior of the apparatus for both telephone company personnel and the subscriber.

As is further known to those skilled in the art, prior art telephone network interface apparatus are known which include individual subscriber line modules but such prior art modules typically, as is still further known, unwantedly require that an entire module be discarded if a single non-function occurs in any component of the module. Accordingly, there exists a need in this art for new and improved telephone network interface apparatus of increased modularity, and for new and improved individual subscriber line modules which, upon the occurrence of a non-function in a single component of a module requires that less than the entire module be discarded.

As is still further known to those skilled in the art, telephone network interface apparatus are known to the prior art which include individual subscriber line modules provided with individual security covers for denying other subscribers access to an individual subscriber's line. These individual security covers are typically locked in place by a padlock, and the construction of the prior art telephone network interface apparatus is such that in the event the individual subscriber moves away and leaves the padlock locked in place, telephone company personnel upon opening of the telephone company cover can remove the locked padlock and gain access to the subscriber's individual line. However, while such prior art telephone network apparatus perform generally well, there exists a need in such apparatus for improved structure for facilitating removal of the locked padlock by the telephone company personnel in a more efficient and less time consuming manner than is presently required with such prior art telephone network interface apparatus.

SUMMARY OF THE INVENTION

It is the object of the present invention to satisfy the foregoing needs. Telephone network interface apparatus in accordance with the present invention and satisfying such needs may include a base including a bottom and an outwardly extending wall circumscribing the bottom, the wall includes opposed first and second wall portions and the bottom and wall provide a compartment divided generally into opposed first and second compartment portions, the first compartment portion is adjacent the first wall portion and the second compartment portion is adjacent the second wall portion, the first compartment portion is for having first terminals mounted therein for connection to the telephone company wiring and the second compartment is for having second terminals mounted therein for connection to subscriber premises wiring; a telephone company cover mounted pivotally to the second wall portion and for overlying the entire compartment, the telephone company cover includes opposed first and second portions, the first portion is solid and is for overlying and closing the first compartment portion and the second cover portion is provided with an opening for overlying and exposing the second compartment portion to the exterior upon the telephone company cover being closed, the telephone company cover is for being fastened only to the base, and the apparatus also includes a first fastener for fastening the telephone company cover only to the base; and a solid subscriber cover mounted pivotally to the second wall portion and for overlying only the second portion of the telephone company cover and for overlying and closing only the second compartment portion, the subscriber cover is for being fastened only to the telephone company cover and the apparatus also includes a second fastener for fastening the subscriber cover only to the telephone company cover. Two embodiments of replaceable individual subscriber line modules of increased modularity are included; one module is provided with a lockable subscriber security cover for denying other subscribers access to the individual subscriber's line terminals.

DESCRIPTION OF THE DRAWINGS

FIG. 4 is a front perspective view of the telephone company cover of the apparatus;

FIG. 5 is a front view of the telephone company cover of the apparatus;

FIG. 6 is a left side view of the telephone company cover of FIG. 5;

FIG. 7 is a perspective view of a replaceable individual subscriber line module embodying the present invention and including a replaceable subscriber wiring bridge and plug/cable;

FIG. 8 is an exploded view of the replaceable individual subscriber line module of FIG. 7;

FIG. 9 is a top view of the replaceable individual subscriber line module of FIGS. 7 and 8 but with the replaceable subscriber wiring bridge and plug/cable being removed;

FIG. 10 is a side view of the replaceable individual subscriber line module of FIG. 7;

FIG. 11 is a front perspective view of an alternate embodiment of telephone network interface apparatus embodying the present invention and with the subscriber cover being shown in the open position;

FIG. 18 is a partial side view, partially in cross-section, showing the cooperating means of the present invention for locking the security cover of the alternate embodiment replaceable individual subscriber line module to deny access to other subscribers.

DESCRIPTION OF THE PREFERRED EMBODIMENTS

Figure 1:
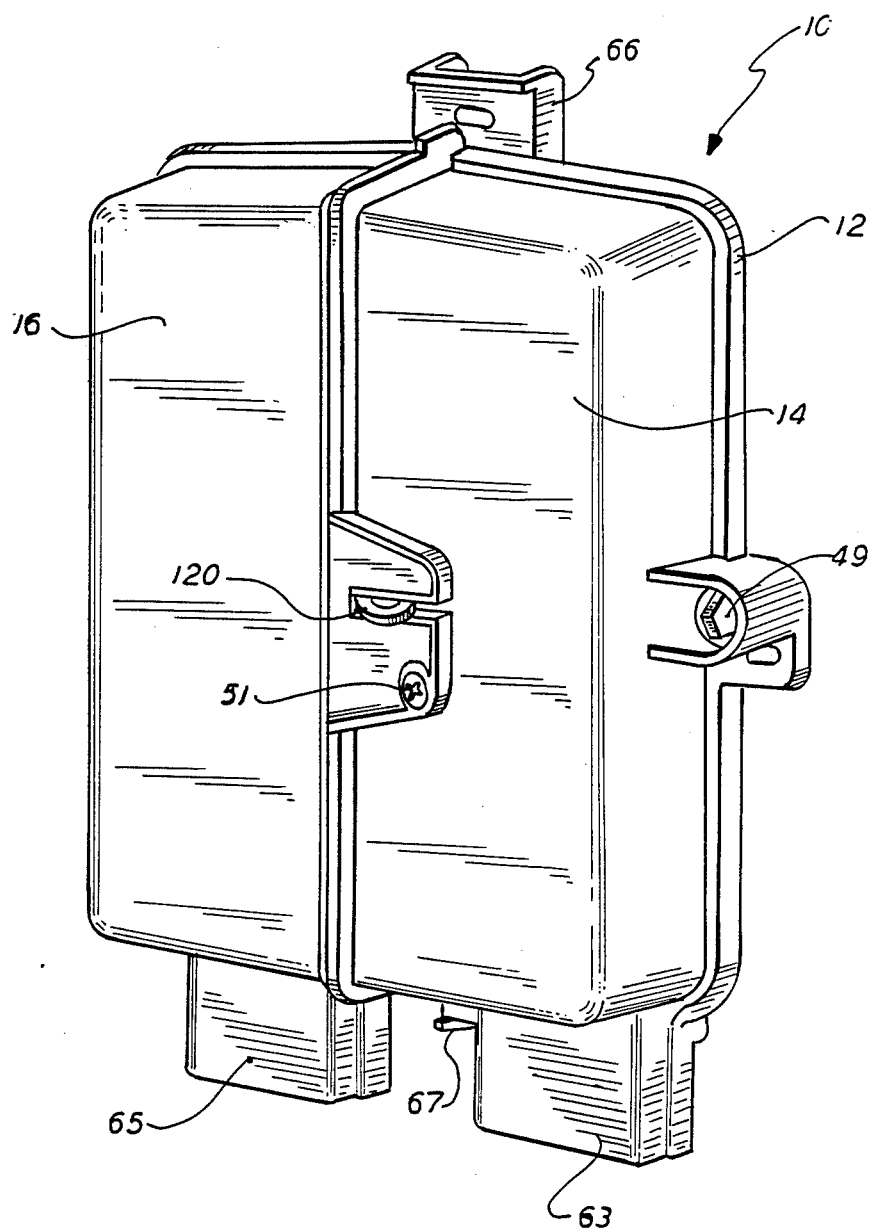
FIG. 1 is a front perspective view of telephone network interface apparatus embodying the present invention.
Figure 2:
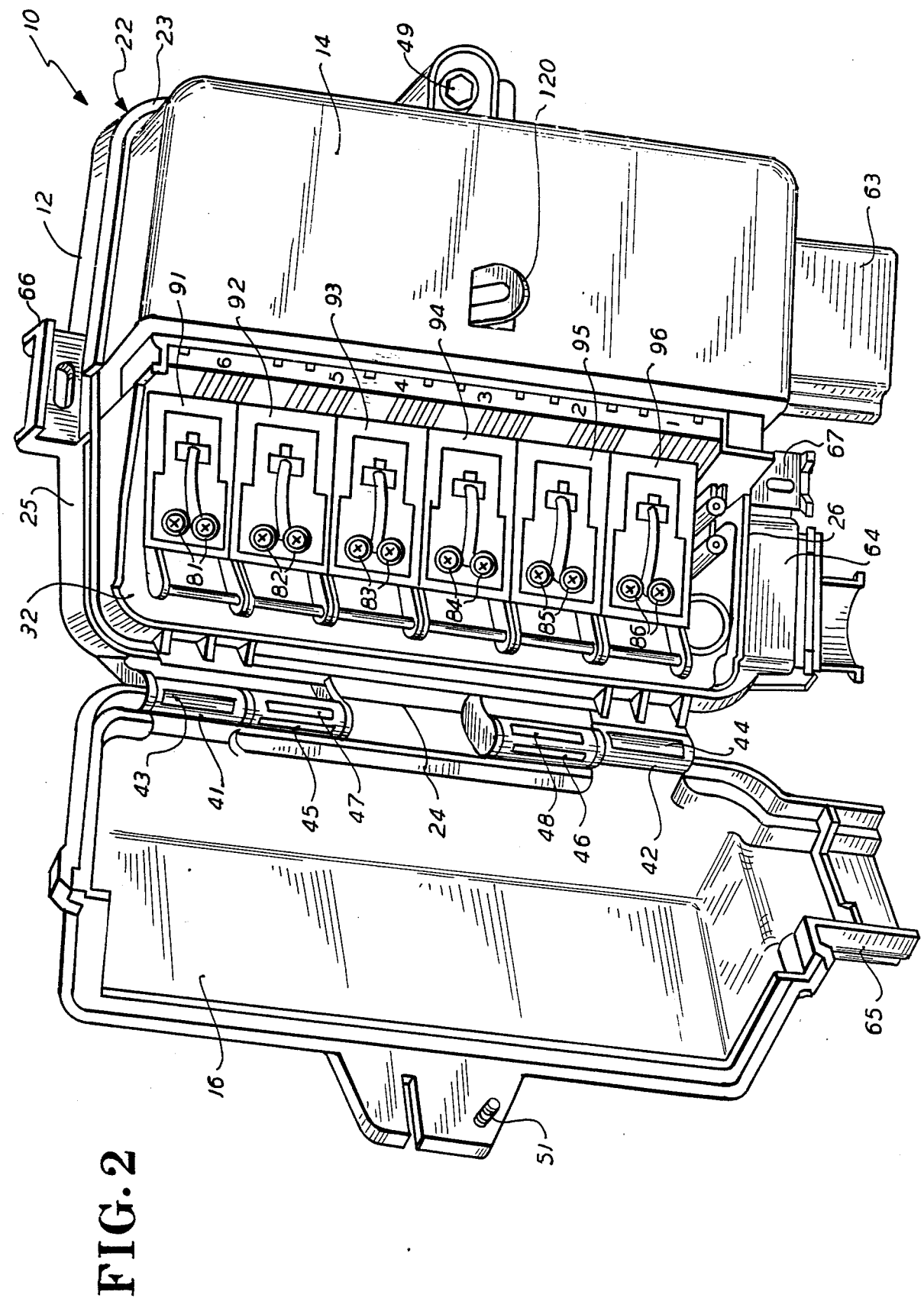
FIG. 2 is a front perspective view of the apparatus showing the subscriber cover in the open position.
Figure 3:
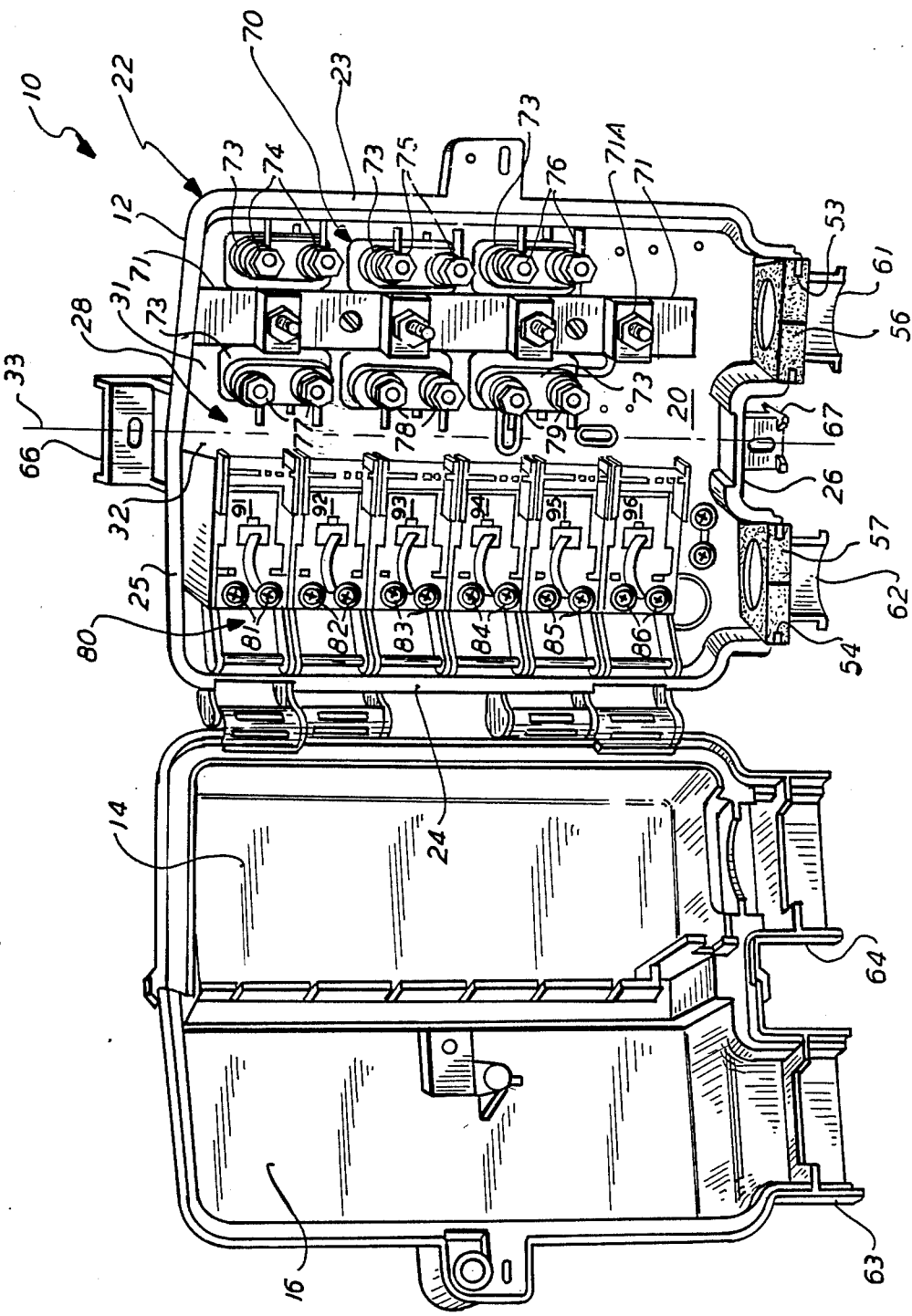
FIG. 3 is a front view of the apparatus showing both the subscriber and telephone company covers in the open positions.

Referring now to FIGS. 1-3, there is shown telephone network interface apparatus embodying the present invention and identified by general numerical designation 10. Apparatus 10 includes a base 12, telephone company cover 14, and subscriber cover 16. The base 12, as best may be understood by reference to FIG. 3, includes a bottom 20 and an outwardly extending wall indicated by general numerical designation 22 circumscribing the bottom; the wall 22 includes opposed first and second wall portions 23 and 24 and opposed third and fourth wall portions 25 and 26. The bottom 20 and wall 22 provide a compartment indicated by general numerical designation 28 which compartment is divided generally into opposed first and second compartment portions 31 and 32 and which compartment division may be readily understood by reference to the diagrammatical dividing line 33 of FIG. 3. The first compartment portion 31 may be understood to be the telephone company compartment portion, and the second compartment portion 32 may be understood to be the subscriber compartment portion.

Referring now more particularly to the telephone company cover 14 and specifically to FIGS. 4-6, it will be understood that the telephone company cover 14 includes opposed first and second portions 36 and 37 with the first portion 36 being solid and for overlying and closing the first compartment portion 31 (FIG. 3) and with the second cover portion 37 being provided with an opening 38 for overlying and exposing the second compartment portion 32 (FIG. 3) to the exterior upon the telephone company cover 14 being closed. The telephone company cover 14 is for being fastened only to the base 12 such as for example by a hex-headed screw 49 which is not easily removable by a subscriber and which requires a special type of tool not typically possessed by the subscriber but which tool typically is possessed by telephone company personnel. The telephone company cover 14 is provided with outwardly extending hinge members 41 and 42 for wedgedly and pivotally engaging corresponding outwardly extending hinge members 43 and 44 (FIG. 2) provided on the second wall portion 24 of the base 12 to mount the telephone company cover pivotally to the base 12.

Similarly, and referring to FIGS. 1-3, the subscriber cover 16 is solid and is for overlying only the second portion 37 of the telephone company cover 14 and further is for overlying and closing only the second compartment portion 32. The subscriber cover 16 (FIG. 2) is provided with outwardly extending hinge members 45 and 46 for wedgedly and pivotally engaging corresponding outwardly extending hinge members 47 and 48 provided on the second wall portion 24 of the base 12 to pivotally mount the subscriber cover to the base; the subscriber cover is for being fastened only to the telephone company cover such as, for example, by a screw 51.

Fourth wall portion 26 of the base 12 of the telephone network interface apparatus 10, FIG. 3, is provided with first and second openings 53 and 54 for providing respective entrances into the apparatus 10 for telephone company wiring and subscriber premises wiring. As shown in FIG. 3, the openings may be provided with grommets 56 and 57 in a manner known to those skilled in the art.

Further, it will be understood, the base 12, FIG. 3, is provided with downwardly extending conduit clamp support members 61 and 62, the telephone company cover 14, FIGS. 3 and 4, is provided with corresponding downwardly extending cover members 63 and 64, and the subscriber cover 16, FIG. 1, is provided with a downwardly extending cover member 65, for covering the conduit clamp supports upon the doors being closed.

As shown in FIGS. 1-3, the base 12 is provided with opposed outwardly extending support members 66 and 67 formed integrally with the base and provided, for example, with holes as shown for receiving fastening members such as screws for mounting the base to a support such as a wall.

In accordance with the further teachings of the present invention, and referring again to FIGS. 2 and 3 and primarily to FIG. 3, it will be further understood that the first compartment portion 31 (e.g. telephone company compartment portion) is for having first terminals indicated by general numerical designation 70 mounted therein for connection to telephone company wiring, and that the second compartment portion 32 (e.g. subscriber compartment portion) is for having second terminals indicated by general numerical designation 80 mounted therein for connection to subscriber premises wiring.

Referring more specifically to the first terminals 70, FIG. 3, it will be understood that these terminals include a ground buss 71 mounted to the bottom 20 of the base 12 such as by screws as shown, a plurality of electrical protection devices 73, such as lightning arrestors, mounted on and electrically connected to the buss 71, and a plurality of pairs of telephone company wiring terminals 74 . : . 79 mounted on the electrical protection devices 73 and which pairs of telephone company wiring terminals are for connection to the incoming telephone company wiring. As is further shown in FIG. 3, the buss 71 may be provided with a separate terminal 71A for connection to earth ground whereby the buss 71 remains grounded at all times particularly while the telephone company wiring is being connected and disconnected to and from the pairs of telephone company wiring terminals 74 . . . 79 by telephone company personnel.

As is shown in both FIGS. 2 and 3, the second terminals 80 may include pairs of terminals 81 . . . 86 mounted, respectively, on a plurality of laterally disposed replaceable individual subscriber line modules 91 . . . 96 mounted removably to the bottom 20 of the base 12 of the telephone network interface apparatus 10.

The structure of the replaceable individual subscriber line, modules 91 . . . 96 may be understood by reference to FIGS. 7-9 wherein the structure of representative module 91 is shown in detail. Module 91 is a generally rectangular, substantially hollow box-like structure including a top 92, bottom 93, opposed sides 94 and 95 and opposed first and second ends 96 and 97; the structure, as shown in FIG. 8, provides an internal space 98 for receiving a telephone circuit, sometimes referred to in the art as station electronics, such as, for example, a maintenance terminating unit, half ringer or the like, suitably interconnected electrically in the manner also known to the art. The pair of subscriber wiring terminals 81 are mounted on the module top 92, FIG. 7, and are for being connected as noted above to an individual subscriber line (e.g. tip and ring wires) of the subscriber premises wiring. A plug 101 is connected to the pair of subscriber terminals 81 by the electrical conductors 103, and the plug is for being removably plugged into a jack 105 also mounted on the module top 92; the jack 105 is provided with electrical connectors 107 for connecting the jack with the pair of telephone terminals 77 shown in FIG. 3. The jack 105 is for removably receiving the plug 101 to interconnect the individual subscriber line connected to the terminals 81 to the telephone company wiring connected to the terminals 77 to provide interconnection therebetween, and the plug 101 is for being removed from the jack 105 to provide a demarcation point between the individual subscriber line and the telephone company wiring and, upon the plug 101 being removed from the jack 105, the jack is for receiving an operating telephone plug (not shown) to determine whether a fault exists on the subscriber premises wiring or the telephone company wiring.

A better understanding of the modularity, i.e. replaceability and removable mounting of the individual subscriber line modules 91 . . . 96, may be obtained by reference to FIG. 10 wherein it will be noted that the bottom 20 of the base 12 is provided with an upwardly extending inverted L-shaped member 110 and an inwardly extending hole 112 and that the module 91 is provided with an outwardly extending member 114 and a downwardly extending member 115. For removable mounting of the module to the base, the outwardly extending member 114 is wedgedly received under the inverted L-shaped member 110 and the downwardly extending member 115 is received within the hole 112.

Thus, it will be understood further that in accordance with the further teachings of the enhanced modularity of the present invention, the individuality and removable mounting of the modules 91 . . . 96 permit each individual module to be replaced, one at a time, in the event that any component of the module becomes non-functional while retaining the balance of the telephone network interface apparatus 10. More particularly, and by way of example, should any component of the individual subscriber line module 91 (FIGS. 7-10) become non-functional, the subscriber line may be disconnected from the wire screw terminals 81, the electrical connectors 107 disconnected from the telephone terminals 77 (FIG. 3), and the individual subscriber line module 91 removed from the apparatus 10 by pulling up on the first end of the module 91 (FIG. 10) to pull the downwardly extending module member 115 from the hole 112 provided in the bottom 20 and to thereafter unwedge the outwardly extending module member 114 from the inwardly extending inverted L-shaped member 110 provided on the apparatus bottom 20.

In accordance with still further teachings of the present invention, it will be understood that even further modularity is provided to the replaceable individual subscriber modules of the present invention, and hence to the telephone network interface apparatus 10 of the present invention by embodying the subscriber line terminals (e.g. terminals 81 . . . 86 of FIG. 3) as a replaceable wiring bridge plug/cable, such as the individual replaceable wiring bridge plug/cable identified by general numerical designation 130 shown in FIGS. 7, 8 and 10 and with regard to representative module 91. More particularly, the individual replaceable wiring bridge 130 includes a pair of generally cylindrical members 131 and 132 (FIG. 8) having the pair of subscriber screw wire terminals 81 mounted thereon and the plug 101 and interconnecting conductors or cable 103. The module 91, FIGS. 8 and 9, is provided intermediate the top 92 and bottom 93 with a pair of cylindrical openings or holes 135 and 136 complementary in shape to and for wedgedly receiving the pair of cylindrical members 131 and 132 for removably mounting the individual subscriber wiring bridge 130 in the module 91. This further individuality and modularity of the bridge 130 has been found to be further advantageous since it has been found that most typically it is not the subscriber line terminals 81 which become non-functional in the individual subscriber line modules but instead, typically, it is other components of the replaceable individual subscriber line modules which become non-functional such as, for example, a telephone circuit received within the internal space 98 (FIG. 8) of an individual module. Hence, upon, for example, such telephone circuit becoming non-functional, the entire replaceable individual subscriber line module 91 need not be discarded, and instead the individual replaceable subscriber wiring bridge 130 may be removed from the module while the individual subscriber line remains connected to the terminals 81 and the remaining module discarded while retaining and saving the wiring bridge 130.

Referring again generally to the telephone network interface apparatus 10, and again to FIGS. 1-3, it will be understood that this embodiment of the invention is particularly useful in a multi-line subscriber installation such as a small business or other multi-line subscriber installation wherein, in the embodiment shown, the telephone network interface apparatus 10 accommodates from one to six subscriber lines. The subscriber may obtain access to the replaceable individual subscriber line modules 91 ... 96, and particularly to the pairs of terminals and plugs mounted on the modules, by merely unfastening the fastener or screw 51 to open the subscriber door 16 to the open position shown in FIG. 2 and can do so while the telephone company door 14 remains closed since the subscriber door 16 is fastened only to the telephone company door 14. For security to the multi-lines, the subscriber may utilize a suitable padlock by inserting its shackle through the staple 120 (FIGS. 1 and 2) and the telephone company personnel can easily override the locked padlock by merely unfastening the fastener 49 which opens both the locked subscriber door 16 and the telephone company door 14, as shown in FIG. 3, to provide the telephone company personnel with access to the complete interior of the apparatus 10.

An alternate embodiment of telephone network interface apparatus embodying the present invention is illustrated in FIG. 11 and indicated by general numerical designation 10A. It will be understood that structure of apparatus 10A identical to structure of the above-described apparatus 10 has been given identical numerical designations for convenience of reference. Generally, it will be understood that telephone network interface apparatus 10A is particularly useful in multi-subscriber line applications such as found in an apartment house, business office, condominium and the like, where it is desirable to provide each individual subscriber with security against access to the individual subscriber's line wiring terminals by other subscribers. This individual security, generally, is provided by the individual security covers 141 ... 146 shown in FIG. 11.

Figure 16:
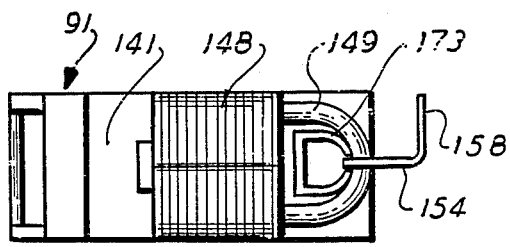
FIG. 16 is a top view of the replaceable individual subscriber line module of FIGS. 12, 13 and 14 showing a locked padlock positioned on top thereof.
Figure 17:
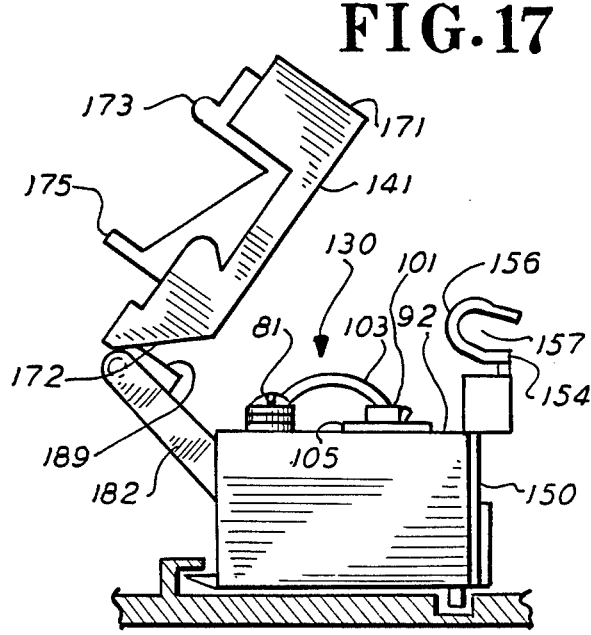
FIG. 17 is a side view of the replaceable individual subscriber line module of FIGS. 11, 12 and 13 showing the security cover in the unlocked and open position.

More particularly with regard to the individual security covers and referring to FIGS. 12-17, and to representative individual subscriber module 91 shown therein, the module is provided with the individual security cover 141 mounted pivotally on the second end 97 of the module which security cover is specifically for covering the pair of subscriber wiring terminals 81, plug 101 and jack 105 (FIG. 17). Generally, it will be understood further that the module, e.g. module 91, and the telephone company cover 14 (FIG. 11) are provided with cooperating means for providing a staple for receiving the shackle of a padlock (e.g. padlock 148 of FIGS. 11 and 16 having shackle 149) to lock the individual security cover over the module upon the telephone company cover 14 being fastened to the base 12 and, which cooperating means, upon the telephone company cover 14 being unfastened and open, permitting telephone company personnel to remove the locked padlock from the staple to permit the telephone company personnel to open the individual security cover. More particularly with regard to such cooperating means, and referring to FIG. 15, a security stable 150 including a lower portion 152 and an upper gooseneck portion 154 is provided. The lower portion 152 of the security staple 150 is mounted, such as by a suitable wedge fit, to the first end 96 of the module 91 and the upper gooseneck portion 154 includes a closed curved rearward portion 156 extending towards the module second end 97, an open forward portion 157, and an integrally formed lateral portion 158 disposed substantially perpendicular to the gooseneck portion 154. As best may be understood from FIGS. 4 and 6, the telephone company cover 14 includes opposed inwardly extending first and second wall portions 161 and 162 with the inwardly extending second wall portion 162 extending inwardly generally along the demarcation line 33 (FIG. 3) which divides the compartment 28 into first (telephone company) and second (subscriber) compartments 31 and 32 as described above. As best may be seen from FIG. 6, the inwardly extending second wall portion 162 of the telephone company cover 14 is provided with a plurality of inwardly extending slots 171 ... 176 for receiving a forward portion 159 (FIG. 15) of the gooseneck portion 154 of the security staple 150 and for permitting sufficient of the closed curved rearward portion 156 of the gooseneck portion 154 to be exposed, note FIG. 18, upon the telephone company cover 14 being closed to permit the closed curved rearward portion 156 of the staple to receive the padlock shackle 149 of the padlock 148 to lock the individual security cover 141 closed upon the telephone company 14 being closed and fastened to the base 12. Upon the individual subscriber leaving or moving away and leaving the padlock 148 locked, it will be understood further in accordance with the further teachings of the present invention that upon the telephone company cover 14 being unfastened from the base and opened by telephone company personnel, the gooseneck portion 154 and lateral portion 158 of the security staple 150 is exposed to permit the telephone company personnel to remove the padlock shackle 149 from the gooseneck and lateral portions 154 and 158 while the padlock 148 remains locked and thereby open the individual security cover 141; it will be understood and appreciated that the padlock 148 can be removed as described by telephone company personnel by merely opening the telephone company cover 14 and that no other act or work operation is required to remove the padlock and open the individual security cover.

Figure 12:
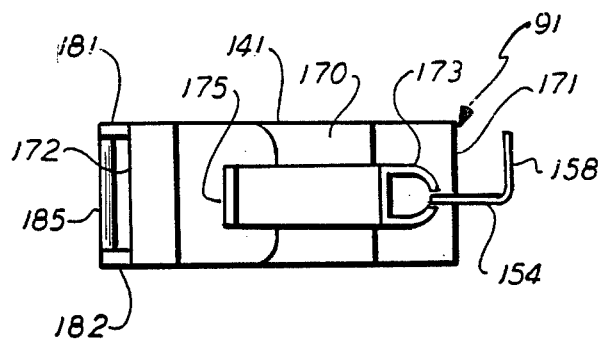
FIGS. 12, 13 and 14 are, respectively, top, side elevation, and right end views of an alternate embodiment of a replaceable individual subscriber line module embodying the present invention and including a top security cover.
Figure 13:
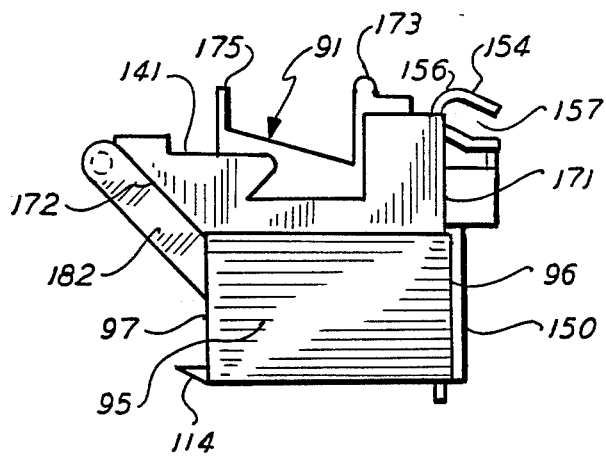
Figure 14:
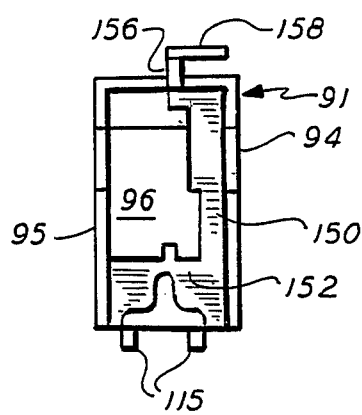
Figure 15:
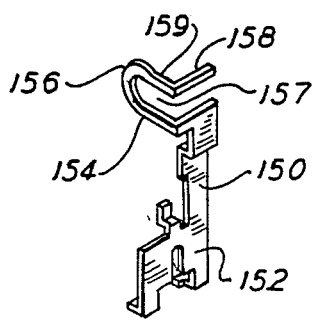
FIG. 15 is a perspective view of a security staple embodied in the replaceable individual subscriber line module of FIGS. 12, 13 and 14.

It will be understood further, and referring particularly to FIGS. 12, 13 and 16, that the top 170 of the individual security cover 141 is provided with opposed first and second ends 171 and 172 corresponding to the opposed first and second ends 96 and 97 of the module 91 and the security cover 141 is provided adjacent its first end 171 with an upwardly extending member 173 complementary in shape to the interior of the padlock shackle 149 and is provided intermediate its first and second ends 171 and 172 with an upwardly extending second member 175; upon the padlock 148 being locked the first member 173 is for receiving the padlock shackle 149 as shown in FIG. 16 and the first 173 and second 175 members are for positioning the locked padlock 148 atop the individual security cover top 170.

As may be understood further by reference to FIGS. 7, 9, 10, 12, 13 and 17, the second end 97 of the module 91 is provided with a pair of generally upwardly and outwardly extending arms 181 and 182 having a shaft 185 extending therebetween and the second end 172 of the security cover 141 is provided with an outwardly extending U-shaped portion 189 for wedgedly and rotatably receiving the shaft 185 to thereby mount the security cover 141 pivotally on the second end 97 of the module 91.

As may be understood still further in accordance with the teachings of the present invention, and referring to FIGS. 7, 8 and 9, and particularly FIG. 9, a space is provided between the arms 181 and 182 and shaft 185 sufficiently large to permit the individual subscriber wiring bridge 130 (FIG. 8) to pass through the space 188 and be removed from the module 91 while the individual subscriber line attached to the screw wire terminals 81 remains connected thereto whereby the individual security module 91 may be discarded upon a component thereof, such as the telephone circuit received within the space 98 (FIG. 8) being non-functional; it being understood that the individual subscriber line (not shown) is first passed through the space 88 prior to connection to the subscriber terminals 81 of the wiring bridge 130.

Referring again to the telephone cover 14 and subscriber 16, and to FIGS. 1, 4 and 5, it will be understood that, in accordance with the teachings of the present invention, by providing the opening 38 with the second portion 37 of the telephone cover 14, and by having the subscriber cover 16 of a size to cover only the opening 38 and the second (subscriber) compartment 32, less material is required than would be were both covers to be solid and overlie or cover the entire compartment 28; hence a cost saving is achieved.

Lastly, it will be understood that many variations and modifications may be made in the present invention without departing from the spirit and the scope thereof.

What is claimed is:

1. Telephone network interface apparatus for interconnecting incoming telephone company wiring to subscriber premises wiring, comprising:
   a base including a bottom and an outwardly extending wall circumscribing said bottom, said wall including opposed first and second wall portions, said bottom and said wall providing a compartment divided generally into opposed first and second compartment portions, said first compartment portion adjacent said first wall portion and said second compartment portion adjacent said second wall portion, said first compartment portion for having first terminals mounted therein for connection to said telephone company wiring and said second compartment portion for having second terminals mounted therein for connection to said subscriber premises wiring;
   a telephone company cover mounted pivotally to said second wall portion and for overlying said compartment, said telephone company cover including opposed first and second portions, said first portion being solid and for overlying and closing said first compartment portion and said second dover portion provided with an opening for overlying and exposing said second compartment portion to the exterior upon said telephone company cover being closed, said telephone company cover for being fastened only to said base, and said apparatus including first fastening means for fastening said telephone company cover only to said base;
   a solid subscriber cover mounted pivotally to said second wall portion and for overlying only said second portion of said telephone company cover and for overlying and closing only said second compartment portion, said subscriber cover for being fastened only to said telephone company cover and said apparatus including second fastening means for fastening said subscriber cover only to said telephone company cover; and
   said apparatus further comprising said first terminals and wherein said first terminals comprise:
   a ground buss mounted to said base in said first compartment portion;
   a plurality of electrical protection devices mounted on and electrically connected to said buss;
   a plurality of pairs of telephone company wiring terminals mounted on said electrical protective devices and for connection to said telephone company wiring; and
   said buss provided with a separate terminal for connection to earth ground whereby said bus remains grounded while said telephone company wiring is being connected and disconnected to and from said pairs of telephone company wiring terminals.

2. Telephone network interface apparatus according to claim 1, wherein said wall further includes opposed third and fourth wall portions extending perpendicular to said opposed first and second wall portions, one of said third and fourth wall portions provided with a first opening for permitting entrance of said telephone company wiring into said first compartment portion and a second opening for permitting entrance of said subscriber premises wiring into said second compartment portion.

3. Telephone network interface apparatus according to claim 2, wherein said openings are provided with grommets.

4. Telephone network interface apparatus according to claim 1 wherein said base is provided with mounting means for mounting said base to a support.

5. Telephone network interface apparatus according to claim 4 wherein said mounting means comprise opposed mounting members formed integrally with said base and provided with holes for receiving fastening members such as screws for mounting said base to said support.

6. Telephone network interface apparatus according to claim 1 wherein said electrical protection devices comprise lightning arrestors.

7. Telephone network interface apparatus according to claim 1 wherein said second terminals comprise a plurality of pairs of second terminals, and wherein said apparatus comprise said second terminals and wherein said second terminals comprise a plurality of laterally disposed replaceable individual subscriber line modules mounted removably to said base in said second compartment portion and wherein each module is provided with a pair of subscriber wiring terminals comprising said second terminals.

8. Telephone network interface apparatus according to claim 7 wherein each of said modules comprise:
   a generally rectangular, substantially hollow box-like structure including a top, bottom, opposed sides and opposed first and second ends with said first end for being disposed towards said first wall portion and said second end for being disposed toward said second wall portion, said structure providing an internal space for receiving a telephone circuit;
   said pair of subscriber wiring terminals mounted on said top adjacent said second end and for connection to an individual subscriber line of said subscriber premises wiring;
   a plug connected to said pair of subscriber wiring terminals by first electrical conductors; and
   a jack mounted on said top and provided with second electrical conductors for connecting said jack with a pair of said telephone company wiring terminals, said jack for receiving said plug to interconnect said individual subscriber line and said telephone company wiring and said plug for being removed from said jack to provide a demarcation point between said individual subscriber line and said telephone company wiring, and upon said plug being removed from said jack said jack for receiving an operating telephone plug to determine whether a fault exists on said subscriber wiring or said telephone company wiring.

9. Telephone network interface apparatus according to claim 8 wherein said base bottom is provided with an upwardly extending inverted L-shaped member and an inwardly extending hole, wherein said module is provided with an outwardly extending member and a downwardly extending member, and wherein said outwardly extending member is for being wedgedly received under said inverted L-shaped member and said downwardly extending member is for being received in said hole to removably mount said module to said base.

10. Telephone network interface apparatus according to claim 8 wherein said pair of subscriber wiring terminals comprise an individual replaceable subscriber wiring bridge including a pair of generally cylindrical members having a pair of screw wire terminals mounted at the top thereof for connection to said individual subscriber line and wherein said plug is connected to said pair of screw wiring terminals by said first electrical conductors, wherein said module is provided intermediate said top and bottom thereof with a pair of cylindrical holes complementary in shape to and for wedgedly receiving said pair of cylindrical members for removably mounting said individual subscriber wiring bridge in said module.

11. Telephone network interface apparatus according to claim 8 wherein said module further comprises an individual security cover mounted pivotally on said second end of said module and for covering said pair of subscriber wiring terminals, said plug and said jack, and said module and said solid portion of said telephone company cover provided with cooperating means for providing a staple for receiving the shackle of a padlock to lock said individual security cover over said module upon said telephone company cover being fastened to said base and upon said telephone company cover being opened for permitting telephone company personnel to remove said locked padlock from said staple to permit said telephone company personnel to open said individual security cover.

12. Telephone network interface apparatus according to claim 11 wherein said first solid portion of said telephone company cover includes opposed inwardly extending first and second wall portions with said inwardly extending second wall portion extending inwardly generally along a line of demarcation dividing said first and second compartment portions, and wherein said cooperating means comprise:
  a security staple including a lower portion secured to said first end of said module and an upper gooseneck portion extending above said module top, said gooseneck portion including a closed, curved rearward portion extending towards said second end and an open forward portion extending towards said second end, and including an integrally formed lateral portion disposed substantially perpendicular to said gooseneck portion, and
  said inwardly extending second wall portion of said first solid portion of said telephone company cover which is provided with a plurality of inwardly extending slots each for receiving said forward portion of said gooseneck portion of said security staple and for permitting sufficient of said curved rearward portion of said gooseneck portion to be exposed upon said telephone company cover being closed to provide said staple for receiving said padlock shackle to lock said individual security cover upon said telephone cover being closed and fastened to said base, and upon said telephone cover being unfastened from said base and opened by telephone company personnel, said gooseneck and lateral portions of said security staple being exposed to permit said telephone company personnel to remove said padlock shackle from said gooseneck and lateral portions while said padlock remains locked and thereby open said individual security cover.

13. Telephone network interface apparatus according to claim 12, wherein the top of said individual security cover is provided with opposed first and second ends corresponding to said opposed first and second ends of said module and wherein said security cover is provided adjacent said first end thereof with an upwardly extending first member complementary in shape to the interior of said padlock shackle and provided intermediate said opposed first and second ends thereof with an upwardly extending second member, upon said padlock being locked said first member for receiving said padlock shackle and said first and second members for positioning said locked padlock atop said individual security cover top.

14. Telephone network interface apparatus according to claim 13 wherein said second end of said module is provided with a pair of generally upwardly and outwardly extending arms having a shaft extending therebetween, and wherein said second end of said security cover is provided with an outwardly extending U-shaped portion for wedgedly and rotatably receiving said shaft thereby mounting said security cover pivotally on said second end of said module.

15. Telephone network interface apparatus according to claim 14 wherein said pair of subscriber wiring terminals comprise an individual replaceable subscriber wiring bridge including a pair of generally cylindrical members having a pair of screw wire terminals mounted at the top thereof for connection to said individual subscriber line and wherein said plug is connected to said pair of screw wiring terminals by said first electrical conductors, wherein said module is provided intermediate said top and bottom thereof with a pair of cylindrical holes complementary in shape to and for wedgedly receiving said pair of cylindrical members for removably mounting said individual subscriber wiring bridge in said module.

16. Telephone network interface apparatus for interconnecting incoming telephone company wiring to subscriber premises wiring, comprising:
  a base including a bottom and an outwardly extending wall circumscribing said bottom, said bottom and said wall generally providing telephone company and subscriber compartments, said telephone company compartment for having a plurality of pairs of telephone company wiring terminals mounted therein for connection to said telephone company wiring and said subscriber compartment for having a plurality of pairs of subscriber terminals mounted therein for connection to said subscriber premises wiring;
  a pivotally mounted telephone company cover for being fastened closed over said telephone company compartment;
  a pivotally mounted subscriber cover for being fastened closed over said subscriber compartment; and a plurality of laterally disposed replaceable individual subscriber line modules mounted removably in said subscriber compartment and wherein each module comprises:
- a generally rectangular, substantially hollow box-like structure including a top, bottom, opposed sides and opposed first and second ends with said first end for being disposed towards said first wall portion and said second end for being disposed towards said second wall portion, said structure providing an internal space for receiving a telephone circuit,
- a pair of said subscriber wiring terminals mounted on said top adjacent said second end and for connection to an individual subscriber line of said subscriber premises wiring,
- a plug connected to said pair of subscriber wiring terminals by first electrical conductors,
- a jack mounted on said top and provided with second electrical conductors for connecting said jack with a pair of said telephone company wiring terminals, said jack for receiving said plug to interconnect said individual subscriber line and said telephone company wiring and said plug for being removed from said jack to provide a demarcation point between said individual subscriber line and said telephone company wiring, and upon said plug being removed from said jack said jack for receiving an operating telephone plug to determine whether a fault exists on said subscriber wiring or said telephone company wiring, and
- an individual security cover mounted pivotally on said second end of said module and for covering said pair of subscriber wiring terminals, said plug and said jack, and said module and said solid portion of said telephone company cover provided with cooperating means for providing a staple for receiving the shackle of a padlock to lock said individual security cover over said module upon said telephone company cover being fastened to said base and upon said telephone company cover being opened for permitting telephone company personnel to remove said padlock upon said padlock being locked from said staple to permit said telephone company personnel to open said individual security cover while said padlock remains locked.

17. Telephone network interface apparatus according to claim 16 wherein said telephone company cover includes an inwardly extending portion extending inwardly generally along a line of demarcation dividing said telephone company and said compartments, and wherein said cooperating means comprise:
- a security staple including a lower portion secured to said first end of said module and an upper gooseneck portion extending above said module top, said gooseneck portion including a closed, curved rearward portion extending towards said second end of said module and an open forward portion extending towards said first end, and including an integrally formed lateral portion disposed substantially perpendicular to said gooseneck portion, and
- said inwardly extending portion of said telephone company cover provided with a plurality of inwardly extending slots each slot for receiving said open forward portion of said gooseneck portion of said security staple and for permitting sufficient of said curved rearward portion of said gooseneck portion to be exposed upon said telephone company cover being closed to provide said staple for receiving said padlock shackle to lock said individual security cover upon said telephone cover being closed and fastened to said base, and upon said telephone cover being unfastened from said base and opened by telephone company personnel, said gooseneck and lateral portions of said security staple being exposed to permit said telephone company personnel to remove said padlock shackle from said gooseneck and lateral portions while said padlock remains locked and thereby open said individual security cover.

18. Telephone network interface apparatus according to claim 16 wherein said second end of said module is provided with a pair of generally upwardly and outwardly extending arms having a shaft extending therebetween, and wherein said second end of said security cover is provided with an outwardly extending U-shaped portion for wedgedly and rotatably receiving said shaft thereby mounting said security cover pivotally on said second end of said module.

19. Telephone network interface apparatus according to claim 16 wherein said pair of subscriber wiring terminals comprise an individual replaceable subscriber wiring bridge including a pair of generally cylindrical members having a pair of screw wire terminals mounted at the top thereof for connection to said individual subscriber line and wherein said plug is connected to said pair of screw wiring terminals by said first electrical conductors, wherein said module is provided intermediate said top and bottom thereof with a pair of cylindrical holes complementary in shape to and for wedgedly receiving said pair of cylindrical members for removably mounting said individual subscriber wiring bridge in said module.

20. Telephone network interface apparatus for interconnecting a plurality of incoming telephone lines to a plurality of subscriber premises lines and for providing demarcation points therebetween to facilitate determination of whether a fault exists on one of said incoming telephone lines or one of said subscriber premises lines, comprising:
- a base including a bottom and an outwardly extending wall circumscribing said bottom, said bottom and wall providing generally a telephone company compartment and a subscriber compartment;
- a pivotally mounted telephone company cover for being pivoted closed and fastened over said telephone company compartment and for being unfastened and pivoted open to provide access to said telephone company compartment;
- a pivotally mounted subscriber cover for being pivoted closed and fastened over at least said subscriber compartment and for being unfastened and pivoted open to provide access to said subscriber compartment;
- a plurality of sets of associated subscriber terminals, plug and jack mounted in said subscriber compartment, each of said subscriber terminals for being connected to one of said subscriber premises lines and each of said sets having opposed first and second end portions;
- a plurality of individual security covers, each individual security cover mounted pivotally by hinge means at said first end portion of one of said sets of associated subscriber terminals, plug and jack and for being pivoted closed thereover to cover the same;

a plurality of staples, each staple provided with an opening for receiving the shackle of a padlock and each staple mounted at said second end portion of one of said sets of associated subscriber terminals, plug and jack;

said telephone company cover including an inwardly extending portion and upon said telephone company cover being pivoted closed and fastened over said telephone company compartment, said inwardly extending portion and one of said staples cooperating to permit an individual subscriber to insert the shackle of a padlock through said opening formed in one of said staples and lock one of said individual security covers fastened over one of said sets of associated subscriber terminals, plug and jack and thereby deny other subscribers access to said one set of associated subscriber terminals, plug and jack, and upon said telephone company cover being unfastened and pivoted open, telephone company personnel being permitted to remove said padlock from said one staple while said padlock remains locked whereby said telephone company personnel may gain access to said one set of associated subscriber terminals, plug and jack.

21. Telephone network interface apparatus according to claim 20 wherein said hinge means comprise a pair of arms extending generally upwardly from said first end portion of said one set of associated subscriber terminals, plug and jack, and a generally outwardly extending U-shaped portion provided on a first end of one of said individual security covers, said U-shaped portion for wedgedly and rotatably receiving said shaft.

22. Telephone network interface apparatus for interconnecting at least one incoming telephone line and at least one subscriber premises line and for providing a demarcation point therebetween to facilitate determination of whether a fault exists on said incoming telephone company line or said subscriber premises line, comprising:

at least one individual subscriber module including a base, subscriber terminals mounted on said base for connection to said subscriber premises line, a jack mounted on said base for connection to said incoming telephone company line, and a plug connected to said subscriber terminals and for being removably received within said jack to provide said demarcation point, and a security cover mounted pivotally at one end of said base by a pair of arms extending generally upwardly from said one end of said base and having a shaft extending therebetween and a generally U-shaped member extending outwardly from one end of said security cover, said U-shaped member for wedgedly and rotatably receiving said shaft to thereby mount said security cover pivotally;

telephone company compartment means providing a compartment for receiving at least telephone terminals for connection to said incoming telephone line and including a pivotally mounted telephone company cover for being pivoted closed to deny others access to said telephone company terminals and for being pivoted open to provide telephone company personnel access to said telephone company terminals; and security means, upon said telephone company cover being pivoted closed said security means permitting a subscriber to use a padlock to lock said security cover closed to deny other subscribers access to said subscriber terminals, plug and jack, and upon said telephone company cover being pivoted open, said security means permitting telephone company personnel to override said padlock upon being locked and to pivot said security cover open and gain access to said subscriber terminals, plug and jack while said padlock remains locked.

23. Telephone network interface apparatus according to claim 22 wherein said security means include an elongated locking member mounted at the opposite end of said base and including an opening for receiving the shackle of said padlock and a portion of said telephone company cover extending outwardly therefrom.

* * * * *